United States Patent
Laphan et al.

(10) Patent No.: US 6,530,134 B1
(45) Date of Patent: Mar. 11, 2003

(54) MOLDED CASKET SHELL AND TRIM THEREFORE

(75) Inventors: Dennis C. Laphan, Cincinnati, OH (US); Ilija Rojdev, Fairfield, OH (US)

(73) Assignee: Batesville Services, Inc., Batesville, IN (US)

( * ) Notice: Subject to any disclaimer, the term of this patent is extended or adjusted under 35 U.S.C. 154(b) by 0 days.

(21) Appl. No.: 09/304,779

(22) Filed: May 4, 1999

Related U.S. Application Data

(62) Division of application No. 08/456,813, filed on Jun. 1, 1995, now Pat. No. 5,928,599.

(51) Int. Cl.⁷ .............................................. A61G 17/00
(52) U.S. Cl. ................................................. 27/7; 27/2
(58) Field of Search .................................. 27/2, 7

(56) References Cited

U.S. PATENT DOCUMENTS

| | | | | |
|---|---|---|---|---|
| 180,207 A | * | 7/1876 | Daniels | 27/7 |
| 2,590,221 A | | 3/1952 | Stevens | |
| 2,876,498 A | | 3/1959 | Nason | 264/516 |
| 3,126,582 A | | 3/1964 | Scott | |
| 3,159,901 A | * | 12/1964 | Harrington et al. | 27/7 |
| 3,164,880 A | * | 1/1965 | Hotchkiss | 27/7 |
| 3,353,238 A | | 11/1967 | Sieloff | |
| 3,377,659 A | | 4/1968 | Hucks, Jr. | |
| 3,598,463 A | | 8/1971 | Kesling | 425/504 |
| 3,702,355 A | | 11/1972 | Hayden | 264/516 |
| 3,720,540 A | | 3/1973 | Wimmer | 428/430 |
| 3,743,236 A | | 7/1973 | Schwenk et al. | |
| 3,770,546 A | | 11/1973 | Childress et al. | 264/547 |
| 3,776,682 A | | 12/1973 | Parmann | |
| 3,781,394 A | | 12/1973 | Houghton | |
| 3,811,810 A | | 5/1974 | Moller | |
| 3,982,875 A | | 9/1976 | Abey | |
| 3,986,809 A | | 10/1976 | Haag | |
| 4,101,626 A | | 7/1978 | Takahashi et al. | |
| 4,110,390 A | | 8/1978 | Olcott et al. | 264/511 |
| 4,124,421 A | | 11/1978 | Fujii | |
| 4,157,885 A | | 6/1979 | Tippmann | |
| 4,174,556 A | | 11/1979 | Richings | |
| 4,423,000 A | | 12/1983 | Teraoka | 264/545 |
| 4,474,725 A | | 10/1984 | Sands | 264/511 |
| 4,660,498 A | | 4/1987 | Madison | 264/516 |
| 4,727,632 A | * | 3/1988 | Yearsley | 27/35 |
| 4,890,366 A | | 1/1990 | Schaapveld | |
| 5,121,529 A | | 6/1992 | McClure | 27/7 |
| 5,128,090 A | | 7/1992 | Fujii et al. | |
| 5,129,804 A | | 7/1992 | Perantoni et al. | |
| 5,201,980 A | | 4/1993 | Chandler et al. | 156/196 |
| 5,485,661 A | | 1/1996 | McClure | 27/7 |

FOREIGN PATENT DOCUMENTS

| | | | |
|---|---|---|---|
| GB | 2202486 | 9/1988 | 264/511 |
| JP | 60-125632 | 7/1985 | 264/516 |
| JP | 60-42867 | 9/1985 | 264/516 |
| JP | 61-133514 | 6/1986 | 264/516 |
| JP | 62-4057 | 1/1987 | 264/516 |
| JP | 62-214925 | 9/1987 | 264/516 |
| JP | 62-251122 | 10/1987 | 264/511 |
| JP | 63-212528 | 9/1988 | 264/516 |

* cited by examiner

*Primary Examiner*—Jan H. Silbaugh
*Assistant Examiner*—Edmund H. Lee
(74) *Attorney, Agent, or Firm*—Wood, Herron & Evan, L.L.P.

(57) ABSTRACT

A method of forming an article of manufacture which includes an undercut therein comprises the steps of providing a tool, removably positioning at least one consumable form adjacent to the tool, providing settable material from which to mold a finished part, molding the material onto the tool and on the form so as to encapsulate the form within the material to thereby form an undercut therein, allowing the material to set to form the finished part and separating the tool from the finished part and the encapsulated form. A method is also provided for forming articles of manufacture of various configurations utilizing a single generic tool by repeating the steps with differently shaped forms removably affixed to the single generic tool in different locations to produce a plurality of finished parts of varying configurations with the single generic tool.

12 Claims, 2 Drawing Sheets

MOLDED CASKET SHELL AND TRIM THEREFORE

This Application is a Division of Ser. No. 08/456,813 filed Jun. 1, 1995 now U.S. Pat. No. 5,928,599.

FIELD OF THE INVENTION

This invention relates generally to the production of molded articles of manufacture, and more particularly to the production of molded plastic or composite articles of manufacture.

BACKGROUND OF THE INVENTION

Traditional methods of molding parts, for example plastic or composite parts, by vacuum molding, sheet compound molding, reaction injection molding, injection molding and/or rotational molding have heretofore required an expensive, complex and specific tool with which to form a particular molded part shape. Thus, should a plurality of shapes of molded parts be desired or required, a separate, specific tool is required to fabricate each specifically shaped part, thus substantially increasing the costs to manufacturers.

Further, should a manufacturer desire to include features such as undercuts in a molded part, expensive, complicated collapsible tooling is required to remove the tool from the molded part in the area of the undercut. Such expensive, complicated tooling generally must include a complex system of slides and ways to accomplish such collapsing to remove the tool from the formed part. Thus, manufacturers have either had to purchase or construct such complex tooling in order to form undercuts in their molded parts, or have simply had to forego such undercuts and in the process do without the substantial functional and aesthetic benefits and attributes attributable to such undercuts.

It is therefore one objective of the present invention to provide a method of forming an article of manufacture including undercuts therein which does not require the use of expensive, complicated collapsible tooling to accomplish the formation of the undercuts in the part.

It is another objective of the present invention to provide a method of forming articles of manufacture of various configurations utilizing only a single generic tool rather than a plurality of specific tools fabricated for each specific part configuration.

SUMMARY OF THE INVENTION

The present invention attains the stated objectives by providing a method of forming an article of manufacture including an undercut therein. The method comprises providing a tool, removably positioning at least one consumable form adjacent to the tool, providing settable material from which to mold a finished part, molding the material on the tool including on the form so as to encapsulate the form within the molded material to thereby form an undercut therein, allowing the molded material to set to form the finished part, and separating the tool from the finished part and the encapsulated form.

The settable material may be plastic. The plastic material may be a preformed blank in the form of a sheet or tub. The sheet or tub may be vacuum molded onto the tool and form. The finished part may be a casket or many other articles of manufacture.

According to another aspect of the present invention, the form includes fasteners premounted thereon whereby cooperating hardware may be attached to the form fasteners after molding the plastic material onto the tool and form. In the case of caskets, the premounted form fasteners or hardware may be used to attach casket handling hardware. The premounted form fasteners could be used for a variety of other purposes for example as attachment sites for additional components, containers, electrical or fluid connectors etc.

According to yet another aspect of the present invention, the form is colored and/or textured and the material is translucent whereby the color and/or texture of the form is visible through the translucent material.

In still another aspect of the present invention, a method of forming articles of manufacture of various configurations utilizing a single generic tool is provided. The method comprises the steps of providing a single generic tool, removably positioning at least one consumable form adjacent to the tool, providing settable material from which to mold a finished part, molding the material on the tool including on the form so as to encapsulate the form within the molded material to thereby define a specific configuration for the finished part, allowing the molded material to set to form the finished part, separating the tool from the finished part and the encapsulated form, and repeating the above steps with differently shaped forms removably affixed to the single generic tool in different locations to produce a plurality of finished parts of varying configurations with the single generic tool.

One advantage of the present invention is that a method of forming an article of manufacture is provided wherein undercuts may be readily included in the shape of the finished part, yet without having to employ the use of expensive, complicated and complex collapsible tools which incorporate slides and ways.

Another advantage of the present invention is that a method of forming articles of manufacture of various shapes with a single generic tool is provided thereby obviating the need to have a specific, custom tool manufactured to produce each differently shaped finished part.

These and other objects and advantages of the present invention will become more readily apparent during the following detailed description taken in conjunction with the drawings herein, in which:

DETAILED DESCRIPTION OF THE INVENTION

Figure 1:
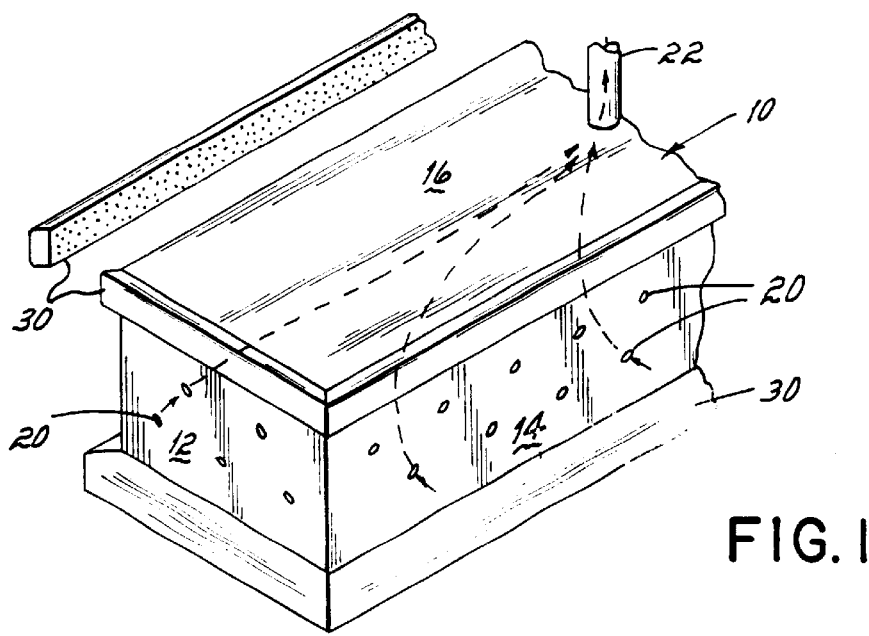
FIG. 1 is a fragmentary perspective view of a generic tool including consumable forms thereon utilized in the fabrication of an article of manufacture according to the principles of the present invention.

Referring first to FIG. 1, there is illustrated a generic tool 10 utilized in forming an article of manufacture according to the principles of the present invention. The generic tool 10 as illustrated is generally rectangular in shape and may be sized appropriately depending on the specific part to be fabricated. Other shapes may be utilized for other applications. For example, one specific application of the present invention is in the fabrication of caskets; tool 10 would thus be sized accordingly.

The generic tool 10 includes a pair of end walls, one of which is shown at 12, and a pair of side walls, one of which is shown at 14. The tool may also include a top wall 16 which may form a part of a "vacuum box" and a bottom wall (not shown). The side and end walls 12 and 14 include a-plurality of holes 20 which are in fluid communication with an outlet 22 which is to be connected to a vacuum source for vacuum molding a part on the tool 10. While tool 10 is illustrated as being a male tool for forming thereon a female part, it will be appreciated that the principles of the present invention could as well be employed with a female tool in the production of a male part, for example bath tubs, spas etc.

A plurality of forms 30 are removably positioned adjacent to the side and end walls 12 and 14 of the tool 10. The forms 30 may have any particular cross sectional configuration which is desired, and preferably are fabricated from inexpensive, light weight and stiff material such as structural foam, wood, plastic extrusions or the like. The forms 30 may be removably secured to the side and end walls 12 and 14 of the tool 10 by such means as low shear strength adhesives, double-sided tape, magnetics, a separate vacuum box, cylinders, pins or the like. Alternatively, a free standing system could be employed for positioning the forms adjacent the tool.

Figure 2:
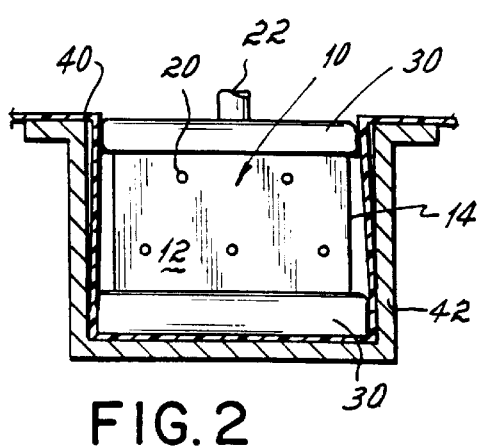
FIG. 2 is a cross-sectional view of the tool and forms of FIG. 1 inserted into a preformed plastic tub blank.

Referring now to FIG. 2, a preformed blank 40 of a settable material, for example plastic, which, as illustrated, is a generally rectangular-shaped tub, may be supported in a fixture 42. The tool 10 with forms 30 thereon is inserted into the blank 40 as is illustrated.

Figure 3:
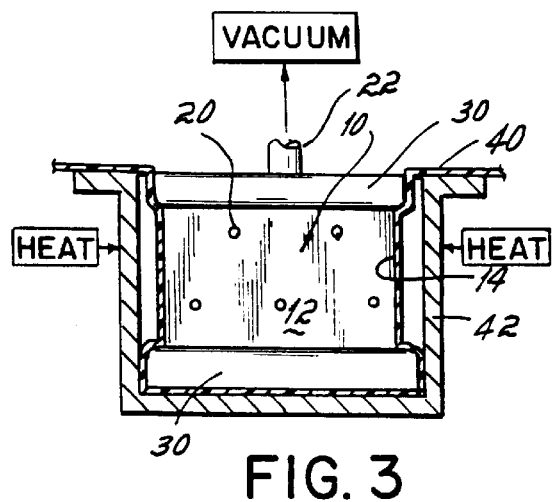
FIG. 3 is a view similar to FIG. 2 illustrating the plastic tub being heated and vacuum molded to the tool and forms during heating of the blank.

Referring now to FIG. 3, heat is applied from a heat source to the walls of the tub 40 to soften the plastic, while at the same time the vacuum source applies a vacuum to the tool 10 and through holes 20 thus vacuum forming or molding the softened plastic tub blank 40 to the side and end walls 12 and 14 and bottom of the tool 10 and at the same time encapsulating the consumable forms 30.

Figure 4:
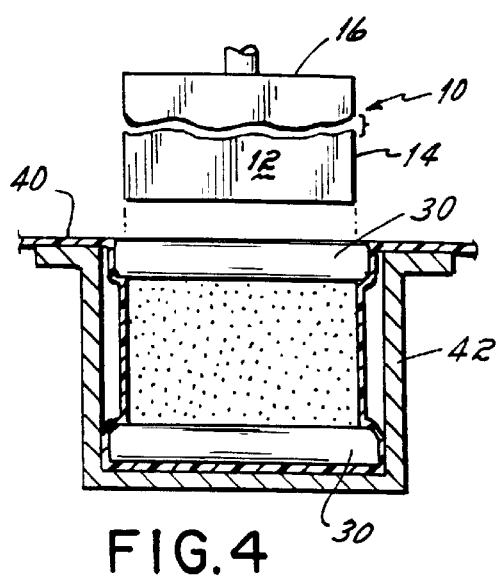
FIG. 4 is a view similar to FIGS. 2 and 3 illustrating the tool being removed from the finished molded part and from the encapsulated forms.
Figure 5:
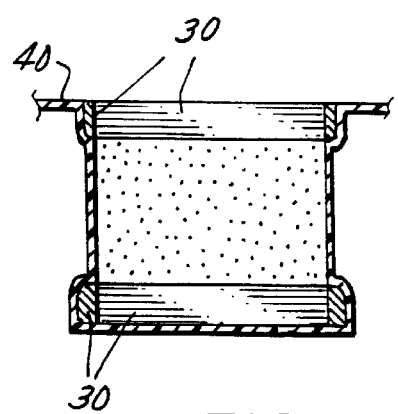
FIG. 5 is a view similar to FIGS. 2–4 of the finished part with encapsulated forms.

Once the plastic is allowed to cool and sets up, the tool 10 may be removed from the finished part by simply pulling the tool out of the part as is shown in FIG. 4. The tool simply shears away from the forms 30 which have been encapsulated, or otherwise consumed, in the finished plastic part.

A preferable material from which to form the preformed blank, and hence the final part, as mentioned above, may be plastic, but other settable materials which are at one point soft and subsequently harden or set up may also be employed. Further, while vacuum molding may be the preferred method of molding the part, other methods of molding or forming may also be utilized in the practice of the present invention, for example such as injection molding, rotational molding, sheet compound molding, reaction injection molding and pressure forming. Preformed blank shapes other than the preformed tub illustrated may be utilized such as simple sheets etc.

One particular product which lends itself to fabrication from the present invention as is mentioned above is a plastic casket, though many other articles of manufacture may be fabricated according to the principles of the present invention, such as, for example, automotive body panels, bathroom tubs and shower stalls, hot tubs, swimming pools, casket vaults, boats and the like, the invention therefore not being limited to the production of caskets.

An alternative method of attaching forms to the tool is to invert the tool and place a form having a generally L-shaped configuration on the tool edge formed by the tool side and bottom walls and the tool end and bottom walls, whereby the form is held in place on the tool simply by gravity.

In the production of caskets, the forms 30 may include premounted therein fasteners whereby casket handling hardware may be attached to the form fasteners after molding the plastic blank onto the tool and form. For example, a plurality of nuts could be pressed or otherwise mounted in the forms, and once the plastic casket is formed, one would need only to pierce the plastic casket skin over the nut for threadably engaging the nut with, for example, a threaded bolt to secure casket handling hardware to the casket exterior. Other applications for other products include providing attachment sites for additional components, electrical and/or fluid connections and the like.

The forms 30 also readily lend themselves to being brightly colored, which, when utilized with a translucent or transparent plastic to form the casket, will be visible through to the exterior of the casket thereby providing a decorative, ornamental appearance. In addition, the forms 30 could be textured whereby the texture of the form would print through or otherwise be visible through the plastic. The colored and/or textured forms could be utilized in the production of other articles of manufacture other than caskets as well.

A further advantage of fabricating articles of manufacture according to the principles of the present invention is that the invention readily provides for the inclusion of a skeletal structural framework within the article thereby providing for additional stiffness and strength of the article and consequent ability to reduce the skin thickness of the plastic. The forms could be solid or hollow. If hollow, the forms could be filled with structural foam providing contiguous or continuous forms thereby unitizing the forms and improving the strength characteristics. The filling of the forms with structural foam can be accomplished with an injection orifice contained within the tool.

The method of the present invention also readily lends itself to the formation of articles of manufacture of various configurations but utilizing only a single generic tool. In this aspect, a first article of manufacture is fabricated according to the above-described steps in reference to the Figures. Then, those same steps can be repeated, but with differently shaped forms removably affixed to the single generic tool in different locations thereby to produce a plurality of finished parts of varying configurations with the single generic tool.

Figure 6:
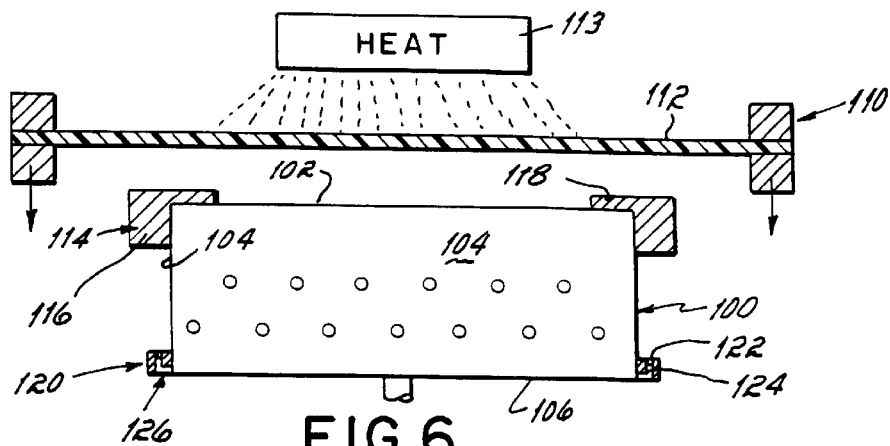
FIG. 6 is a view similar to FIG. 2 but of a different process for carrying out the invention wherein the tool is inverted and a preformed plastic sheet blank is positioned above the tool and is heated to be subsequently drawn down over the tool.

Referring now to FIGS. 6–9, there is illustrated a preferred technique for vacuum molding an article of manufacture according to the present invention. In FIG. 6, tool 100 is inverted and has a bottom 102, sides 104 and a top or vacuum box 106 connectable to a source of vacuum. A rectangular frame 110 clamps and supports a rectangular sheet of plastic 112 around its periphery. Heat is applied to the sheet 112 from a source of heat 113 to soften the sheet 112. A form 114 which is generally L-shaped in cross-section has a leg 116 and a foot 118. Foot 118 is supported atop the bottom 102 of the tool 100. As tool 100 is inverted, the casket or other article of manufacture fabricated by vacuum molding sheet 112 to tool 100 will have the forms 114 associated with the bottom edge of the article of manufacture. Another form 120 includes an aperture 122 therein which accepts the foot 124 of an L-shaped bracket 126 which is attached to tool 100. L-shaped bracket 126 may be fixed to tool 100 or may be removably attached and adjustably repositionable relative thereto as with the use of pins or other means of attachment to vary the position of form 120 relative to form 114.

Figure 7:
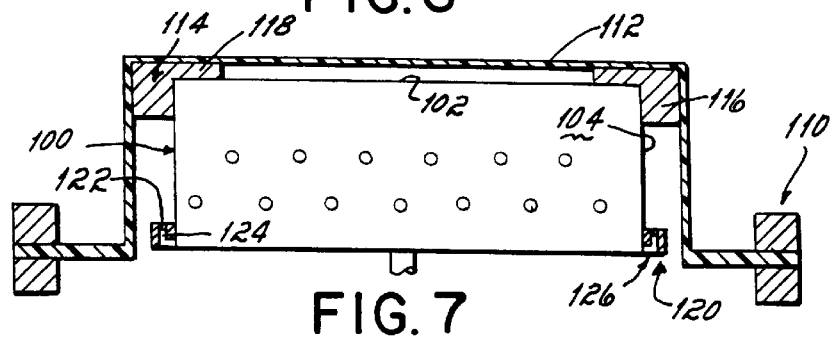
FIG. 7 is a view similar to FIG. 6 illustrating the sheet drawn down over the tool.
Figure 8:
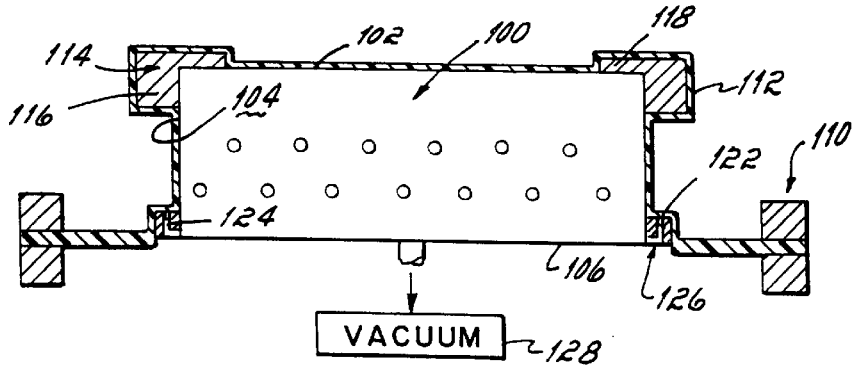
FIG. 8 is a view similar to FIGS. 6 and 7 illustrating the sheet being vacuum molded to the tool and forms.
Figure 9:
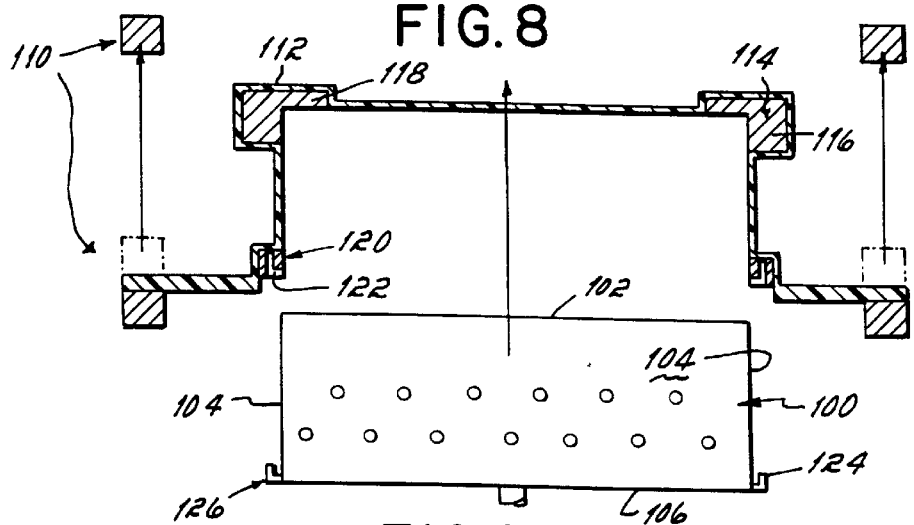
FIG. 9 is a view of the finished part with encapsulated forms removed from the tool.

As illustrated in FIG. 7, as rectangular frame 110 is drawn downwardly over the tool 100, sheet 112 assumes the general rectangular configuration of the tool 100. As shown in FIG. 8, when vacuum is applied from the source of vacuum 128, the sheet 112 closely conforms to the tool 100 and the forms 114 and 120. As shown in FIG. 9, once the plastic sheet has been allowed to cool and set to form the plastic casket, the casket is removed from the tool 100 and the frame 110 is removed from the finished part.

Those skilled in the art will readily recognize numerous adaptations and modifications which can be made to the present invention which will result in an improved method of forming articles of manufacture, yet all of which will fall within the spirit and scope of the present invention as defined in the following claims. For example the settable plastic material would not have to be preformed into a sheet or tub blank as when utilizing the invention in conjunction with an injection molding technique. Accordingly, the invention is to be limited only by the scope of the following claims and their equivalents.

What is claimed is:

1. A casket shell comprising:
a single layer of settable material molded into the size and shape of a casket shell;
a form positioned relative to said settable material only in an area associated with casket shell trim;
said molded material being molded on said form so as to shape said material around said form thereby forming an undercut in said material, said form creating the appearance of casket shell trim;
wherein said form is colored and said material is translucent whereby the color of said form is visible through said translucent material.

2. A casket shell comprising:
a single layer of settable material molded into the size and shape of a casket shell;
a form positioned relative to said settable material only in an area associated with casket shell trim;
said molded material being molded on said form so as to shape said material around said form thereby forming an undercut in said material, said form creating the appearance of casket shell trim;
wherein said form is textured whereby the texture of said form is visible through said material.

3. A casket shell comprising:
settable material molded into the size and shape of a casket shell;
said molded material being molded on a form so as to capture said form within said material;
wherein said form is colored and said material is translucent whereby the color of said form is visible through said translucent material.

4. A casket shell comprising:
settable material molded into the size and shape of a casket shell;
said molded material being molded on a form so as to capture said form within said material;
wherein said form is textured whereby the texture of said form is visible through said material.

5. A casket shell comprising:
settable material molded into the size and shape of a casket shell;
said molded material being molded on a form so as to capture said form within said material;
wherein said form is hollow and is injected with structural foam thereby creating a unitized form structure about the periphery of said casket shell.

6. A casket shell comprising:
settable material molded into the size and shape of a casket shell;
a form positioned relative to said settable material only in an area associated with casket shell trim;
said molded material being molded on said form so as to shape said material around said form thereby creating a peripheral skeletal structural framework in said material and the appearance of casket shell trim.

7. The casket shell of claim 6 wherein the settable material is plastic.

8. The casket shell of claim 6 wherein the settable material is a composite.

9. The casket shell of claim 6 wherein said form includes fastners premounted thereon whereby hardware may be attached to said form after molding said material onto said form.

10. The casket shell of claim 6 wherein said form is colored and said material is translucent whereby the color of said form is visible through said translucent material.

11. The casket shell of claim 6 wherein said form is textured whereby the texture of said form is visible through said material.

12. The casket shell of claim 6 wherein said form is hollow and is injected with structural foam thereby creating a unitized form structure about the periphery of said casket shell.

* * * * *